United States Patent
Alberts

(10) Patent No.: US 7,302,995 B2
(45) Date of Patent: Dec. 4, 2007

(54) APPARATUS AND METHOD FOR INJECTION-MOLDING PRODUCTS

(75) Inventor: Petrus Antonius Alberts, Hengelo (NL)

(73) Assignee: I-Pac Patents B.V., LC Capelle a/d Ijssel (NL)

( * ) Notice: Subject to any disclaimer, the term of this patent is extended or adjusted under 35 U.S.C. 154(b) by 402 days.

(21) Appl. No.: 10/486,935

(22) PCT Filed: Aug. 13, 2002

(86) PCT No.: PCT/NL02/00543

§ 371 (c)(1),
(2), (4) Date: Jul. 8, 2004

(87) PCT Pub. No.: WO03/016017

PCT Pub. Date: Feb. 27, 2003

(65) Prior Publication Data

US 2004/0238149 A1 Dec. 2, 2004

(30) Foreign Application Priority Data

Aug. 13, 2001 (NL) .................................. 1018745

(51) Int. Cl.
 B22D 33/04 (2006.01)
 B29C 45/42 (2006.01)
(52) U.S. Cl. .................. 164/339; 164/341; 164/342; 425/126.1; 425/444; 425/556
(58) Field of Classification Search .................. 164/98, 164/137, 339, 341, 342, 113; 425/126.1, 425/444, 556
See application file for complete search history.

(56) References Cited

U.S. PATENT DOCUMENTS

| 4,690,630 | A | | 9/1987 | Gissinger et al. |
| 4,710,116 | A | * | 12/1987 | Dromigny et al. ......... 425/125 |
| 4,994,224 | A | * | 2/1991 | Itoh et al. .................. 264/247 |
| 5,709,833 | A | | 1/1998 | Simone |
| 5,753,280 | A | | 5/1998 | Coxhead |
| 6,162,037 | A | * | 12/2000 | Verwoerd ................ 425/126.1 |
| 6,550,969 | B1 | * | 4/2003 | Mischler ..................... 384/44 |

FOREIGN PATENT DOCUMENTS

| DE | 198 48 334 A1 | 4/2000 |
| DE | 198 54 663 A1 | 6/2000 |
| EP | 0 341 111 A1 | 11/1989 |
| FR | 2 576 832 | 8/1986 |
| FR | 2699887 | * 7/1994 |
| JP | 08 127 027 | 5/1996 |
| JP | 2000 301 566 | 10/2000 |

* cited by examiner

*Primary Examiner*—Jonathan Johnson
*Assistant Examiner*—I.-H. Lin
(74) *Attorney, Agent, or Firm*—Hoffmann & Baron, LLP

(57) ABSTRACT

An apparatus for injection-molding products, comprising an injection mold (2) divisible into at least two parts (6, 8) such that consequently at least one mold cavity (14) is cleared, wherein on at least one part of the injection mold guiding means (22) are provided for a transfer device (4) for providing an insert in the mold cavity and/or for taking a product from the mold cavity.

17 Claims, 6 Drawing Sheets

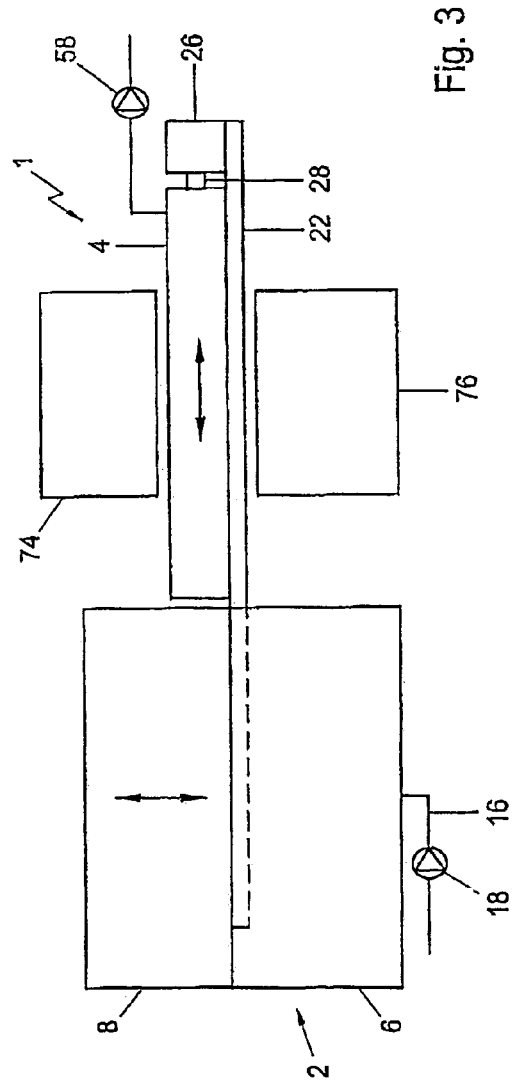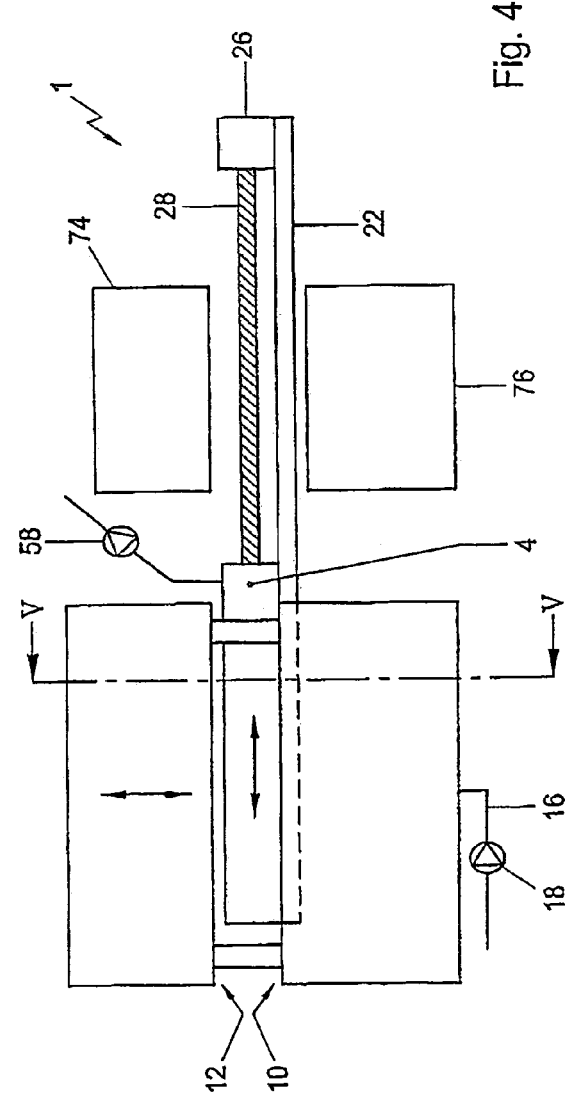

APPARATUS AND METHOD FOR INJECTION-MOLDING PRODUCTS

This application is the U.S. National Phase of International Application Number PCT/NL02/00543 filed on 13 Aug. 2002, which is incorporated herein by reference.

BACKGROUND OF THE INVENTION

The invention relates to an apparatus for injection-molding products.

From NL 1012869, an injection molding apparatus is known, provided with an injection mold and means for placing a label-shaped insert into a mold cavity thereof. With this known injection molding apparatus, a transfer device borne by a robot arm is utilized with which the label is taken up. Then, when the mold is open, with a leading end bearing the label, the transfer device is moved between the mold parts, whereupon the label is placed in the mold cavity with the aid of the transfer device. The transfer device is then retracted by the robot arm, whereupon the mold is closed. A product is formed against the label, in the closed mold, while a new label is taken up with the transfer device.

With this known device, the disadvantage arises that the forces occurring on the robot arm are relatively high as a result of the self-weight of the robot arm and the transfer device and the acceleration and deceleration forces occurring upon movement of the transfer device. Moreover, in this manner, the permissible accelerations and decelerations are limited, so that the cycle time is relatively long. A further disadvantage is that the robot arm and the transfer device are to be of relatively rigid design to obtain a sufficiently accurate positioning of the transfer device, and hence of the label, so that the construction is expensive and, moreover, the weight is disadvantageously affected.

SUMMARY OF THE INVENTION

The invention contemplates an apparatus of the type described in the opening paragraph, wherein the drawbacks mentioned are obviated, while its advantages are maintained. To that end, an apparatus according to the present invention is characterized by an injection mold divisible into at least two parts, such that, as a result, at least one mold cavity is cleared, while on at least one part of the injection mold guiding means are provided for a transfer device for placing an insert into a mold cavity and/or taking a product from a mold cavity.

With an apparatus according to the present invention, during movement, the or each transfer device is guided by guiding means on at least one mold part, so that a particularly accurate positioning is possible. Moreover, the transfer device can then be of relatively light design, so that particularly high accelerations and decelerations are enabled. It is preferred that then the transfer device is borne at least partly and preferably largely or wholly by the guiding means, so that a still more compact, lighter construction be obtained.

The guiding means can, for instance, extend on both sides of the or each mold cavity and can then, for instance, be arranged as guiding rails in and/or on a joining face of the mold.

It is preferred that the guiding means extend such that the transfer device can be moved away from between the different mold parts to a sufficient extent such that the mold can be closed, while, naturally, it is preferred that the distance over which the transfer device is to be moved be minimal. To that end, in particular when several mold cavities are used in one mold, several transfer devices can be utilized which are moved between the mold parts from different sides.

With an apparatus according to the invention, all sorts of inserts can be introduced into the mold cavities, products can be taken from a mold cavity or other operations can be carried out in or next to the mold cavities, for instance cleaning or inspection. In a particularly advantageous embodiment, a transfer device according to the invention is characterized in that, on a first side, it is provided with engaging means for taking up and placing a label in a mold cavity while, on the opposite side, engaging means are provided for taking out a ready product. Thus, the cycle time for manufacturing a product can be kept very short while the taken-out products can be processed further in a simple manner in that they are positively engaged. Preferably, the engaging means are vacuum means or like means working on reduced pressure.

It is preferred that the guiding means are provided in or on the fixed, i.e. stationary part of the mold. This offers constructional advantages and, moreover, operating means for the transfer device then do not need to move along with a mold part.

In an alternative embodiment, the guiding means comprise parts provided on one or more sides of at least one of the mold parts, i.e. in a plane including an angle with the joining face of the mold. As a result, the mold can be of relatively small design, as on the joining face next to the mold cavity (cavities) no space is required for the guiding means. Moreover, in a simple manner, a positioning of the transfer device in a direction approximately at right angles to the joining face is obtained.

In a further alternative embodiment, the injection mold comprises a middle part and two closing parts extending on both sides thereof, while on both sides of the middle part one or more mold cavities and a transfer device guided by guiding means on a mold part are provided Thus, a particularly compact injection molding apparatus is obtained with which rapidly a relatively large number of products can be manufactured.

In a further advantageous embodiment, an injection molding apparatus according to the invention comprises a mold with a frame in which a mold is fixed, the frame comprising guiding elements for the moving mold parts, while the transfer device, at least the guiding means, are arranged such that they extend on at least two sides of one of the respective guiding elements. Thus, notably with multiple molds, in a still more optimal manner, use can be made of the available space.

The invention further relates to a method for injection-molding products, wherein an injection mold is opened and a transfer device is moved between the mold parts, guided by at least one of the mold parts or guiding means provided thereon, with which transfer device at least one operation is carried out in at least one part of at least one mold cavity, whereupon the transfer device is moved away from between the mold parts, guided by at least one mold part of guiding means connected thereto, whereupon the injection mold is closed and a product is injection-molded in the or each mold cavity, whereupon the injection mold is opened and the transfer device is moved back between the mold parts.

With such a method, in a particularly rapid and economical manner a large number of products can be injection-molded. Moreover, the risk of damage to the apparatus or the surroundings is then relatively low, as the occurring forces are relatively low in spite of high motion speeds, at least accelerations and decelerations.

The invention further relates to a transfer device suitable for use in an apparatus or method according to the invention.

Furthermore, the invention relates to an injection mold, suitable for use with an apparatus or method according to the invention.

BRIEF DESCRIPTION OF THE DRAWINGS

In the subclaims, further advantageous embodiments of an apparatus and method according to the invention, and a transfer device and mold to be used therefore are described. In clarification of the invention, embodiments of an apparatus and method according to the invention, and injection molds and transfer devices to be used therewith will be further described with reference to the drawing. In the drawing:

FIGS. 3 and 4 show, in top plan view, an apparatus according to FIG. 1, with a closed mold and an opened mold, respectively.

DETAILED DESCRIPTION OF THE DRAWINGS

Figure 1:
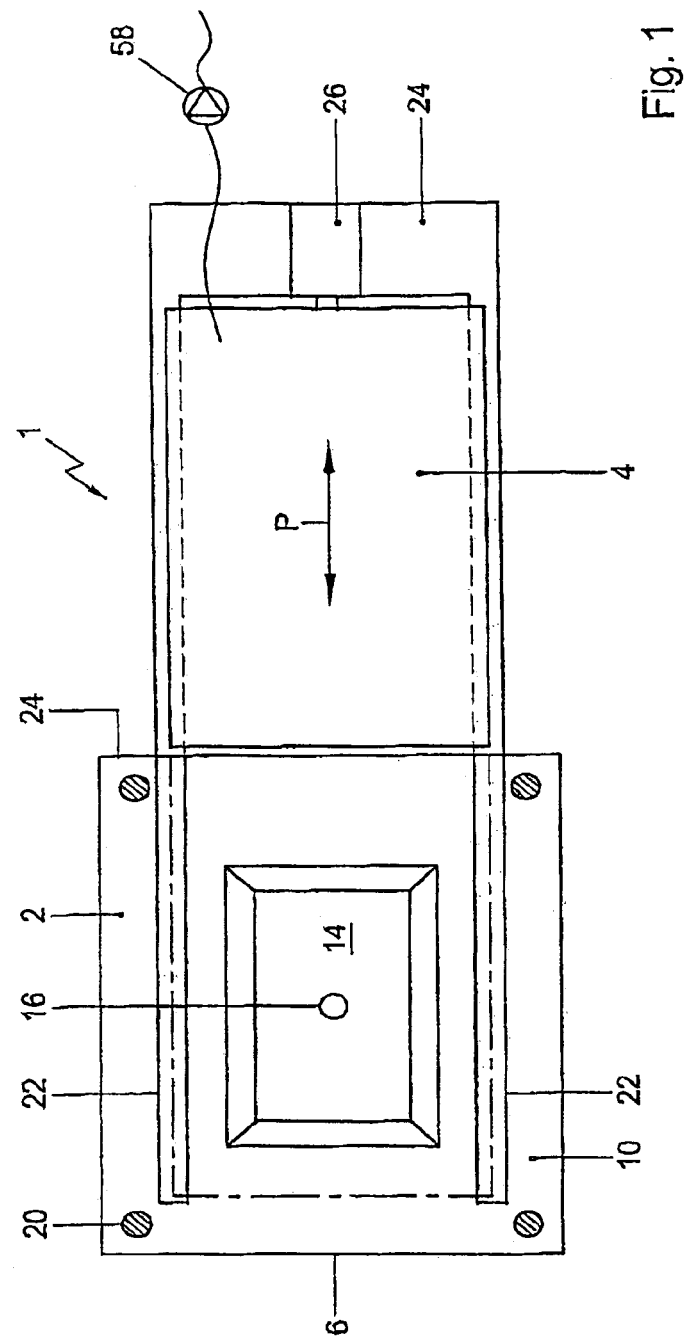
FIG. 1 schematically shows, in side view, with taken-away movable mold part, an apparatus according to the invention.

In this description, identical or corresponding parts have identical or corresponding reference numerals. In the drawing, a number of alternative embodiments are shown of an apparatus according to the invention, with matching transfer devices. Combinations of molds and transfer devices as shown in the separate Figures and variants thereon are understood to fall within the framework of the invention as outlined by the claims.

In FIG. 1, an apparatus 1 is shown for injection-molding products, while only the mold 2 and a transfer device 4, which will be described further, are shown. Such a mold 2 and transfer device 4 can be used in a conventional injection molding apparatus, such as, for instance, a hot-runner. The same holds for the other exemplary embodiments shown. As injection molding machines are generally known per se, they will not be discussed further here.

In FIGS. 3 and 4, the apparatus 1 as shown in FIG. 1 is shown in top plan view. Clearly recognizable here are the mold 2 with a fixedly arranged first mold part 6 and, movable relative thereto, a second mold part 8, also called closing part. In the closing part 8, the direction of movement for opening and closing the mold 2 is represented by an arrow. In FIG. 1, the movable closing part 8 has been omitted for clarity. The first mold part 6 and second mold part 8 have complementary first and second closing faces 10, 12.

As clearly appears from FIG. 1, in the first mold part 6 a mold cavity 14 is provided in which terminates a supply duct 16 of an injection molding apparatus. In FIGS. 3 and 4, the supply duct 16 is schematically represented while the injection molding machine is schematically indicated as a pump 18. Clearly shown are guide rods 20, cross-sectioned in FIG. 1, forming the guide for the moving part 8 are clearly shown.

In the closing face 10 of the first mold part 6, on both sides of the cavity 14, a guiding rail 22 is provided, which guiding rails 22 reach beyond the contour C of the closing face 10, to such an extent that the transfer device 4 can be borne virtually completely on the guiding rails 22 outside the mold 2, such that the mold 2 can be closed next to the trader device 4, as shown in FIGS. 1 and 3. On their side remote from the mold 2, the guiding rails 22 are connected by a transverse frame 24 on which a motor 26 is borne. With this motor 26, a screw spindle 28 can be driven, with which the transfer device 4 can be rolled along the guiding rails 22 forming guiding means for the transfer device 4, to a point between the mold parts 6, 8 when the mold has been brought in an opened position as shown in FIG. 4. In this position, which is schematically represented in FIG. 1 in chain-dotted lines, with the transfer device 4, an operation can be carried out in the mold cavity 14, for instance a label can be placed into or a product can be taken out of the mold cavity 14, as will be elucidated further. After the desired operation has been carried out, the transfer device 4 is pulled away with the aid of the motor 26 and screw spindle 28 from the position between the mold parts 6, 8 shown in FIG. 4, to the position shown in FIG. 3 next to the mold, such that the movable part 8 can be arranged against the stationary part, 6 and a desired product can be formed in the cavity 14. After this product has been formed it can be taken from the mold, for instance with the transfer device 4, as will be elucidated further.

Figure 2:
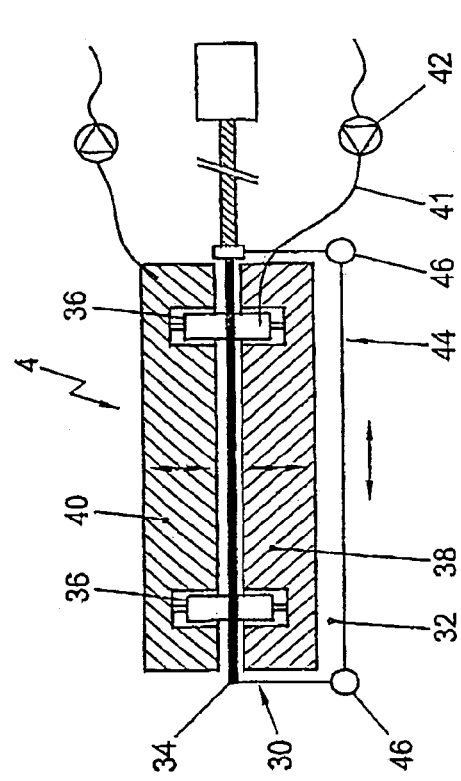
FIG. 2 schematically shows, in cross-sectional top plan view, a transfer device for use in an apparatus according to FIG. 1.

In FIG. 2, schematically in top plan view, a transfer device 4 according to the invention is shown in an advantageous embodiment. This cross-section is taken approximately through the center of the transfer device 4 in a plane approximately parallel to the direction of movement P of the transfer device 4 and at right angles to the dosing faces 10, 12 of the mold parts 6, 8. The transfer device 4 comprises a substantially U-shaped flanged plate 30, the two legs 32 of which extend approximately parallel to the plane of the drawing in FIG. 2, while the middle part 34 extends approximately at right angles thereto, at right angles to the plane of drawing of FIG. 2. On the middle part 34, a number of double-acting piston/cylinder assemblies 36 is provided, so that a first transfer part 38 is borne between the legs 32, while on the opposite side of the middle part 34 a second transfer part 40 is borne by the piston/cylinder assemblies 36. With the aid of, for instance, compressed air or hydraulics supplied via a schematically represented duct 41 and pump 42, the piston/cylinder assemblies 36 can be energized such that the first transfer part 38 and the second transfer part 40 can be moved away from each other, away from the middle part 34, or, conversely, towards each other. Adjacent a lower longitudinal edge 44 of the two legs 32, the transfer device 4 bears a number of wheels 46 or like elements, with which the transfer device 4 is confined in the guiding rails 22, such that the transfer device 4 can only be moved to and fro in the direction P and is fixed in other directions.

Figure 5:
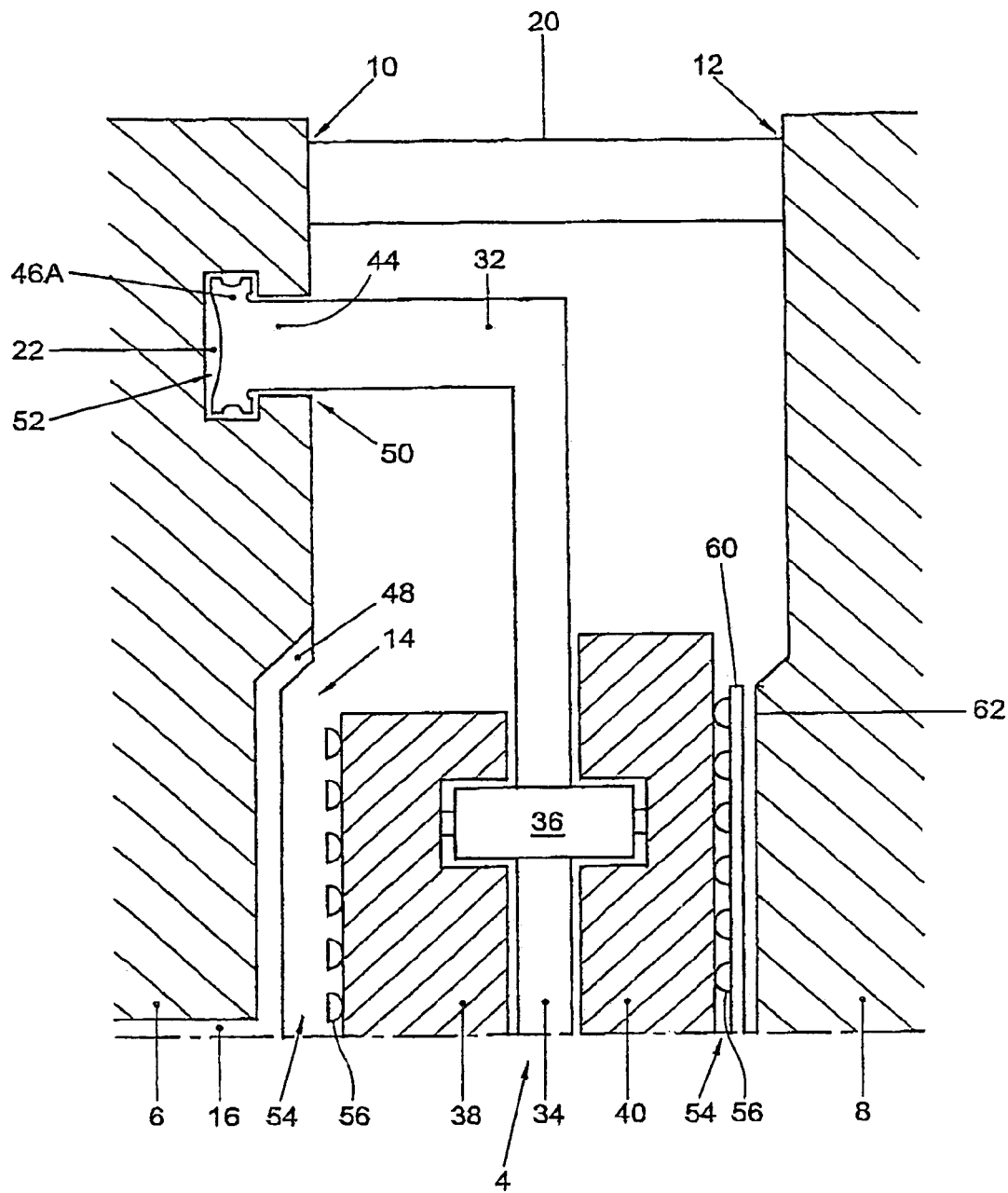
FIG. 5 shows, in cross-sectional view along the line V-V in FIG. 4, an apparatus according to the invention.

In FIG. 5, schematically in front view, a part of a transfer device 4 as shown in FIG. 2 is represented, between a first mold part 6 and a second mold part 8. In FIG. 5, the top half is shown. Clearly visible are a mold cavity 14, provided in the closing face 10, with an injection-molded, in-mold-labeled product 48 therein, and, provided in the closing face 10 next to the mold cavity 14, a guiding rail 2 in the form of a T-shaped groove open towards the closing face 10. The leg 32 of the transfer device 4 has a lower edge 44 reaching into the guiding rail 22, while in this embodiment a widening 52 of the leg 32 is provided for forming a sliding foot 46A instead of the wheels 46 as shown in FIG. 2. On the side facing the closing face 10, the first transfer part 38 is provided with vacuum means 54, schematically represented by vacuum cups 56, which are connected to a vacuum pump 58 by ducts (not shown). When, with the aid of the piston/cylinder assembly 86, the first transfer part 38 is moved towards the product 48, this product 48 is engaged with the vacuum means 54 such that upon retraction, it can be taken from the mold cavity 14 with the first transfer part 38. Optionally, ejection means (not shown) can be provided in the mold cavity 14, as for instance described in NL 1012869, incorporated herein by reference. With such ejection means, the advantage is achieved that the product 48 can be taken out in a simpler manner without the product 48 sustaining damage.

On the side remote from the middle part 34, the second transfer part 40 is also provided with vacuum means 54, schematically represented by vacuum cups 56 which can be energized by a vacuum device (not shown). In FIG. 5, an in-mold label 60 is borne by the vacuum means 54, which label is preferably slightly stretched. Upon movement of the second transfer part 40 in the direction of the second mold part 8, this in-mold label 60 can be transferred to a mold surface 62, whereupon the second transfer part 40 can be retracted. The mold surface 62 can, for instance, be designed to be smooth such that the in-mold label 60 clings thereto by adhesion or cohesion. Or, for instance, vacuum means can be included for retaining the label 60. Also, other means can be utilized for retaining the label, for instance static cling.

When the product 48 has been picked up from the cavity 14 with the transfer device 4 and the label 60 has been provided on the mold surface 62, the transfer device 4 can be rolled or slid to the position shown in FIGS. 1 and 3 with the aid of the motor 26 and screw spindle 28, whereupon the mold 2 can be closed next to the transfer device 4, as shown in FIG. 3. Next, in the mold cavity 14, a new product can be injection-molded, while the label 60 is fixedly connected to the product 48. Next, the mold is opened and the transfer device 4, after the earlier formed product 48 has been withdrawn and a new label 60 has been taken up, is slid back or rolled back between the mold parts 6, 8, as shown in FIGS. 4 and 5, for a next cycle.

In the exemplary embodiments shown in the drawing, the transfer device 4 is both borne and guided by the guiding means 2 which are provided in or on the mold 2, at least in or on a part thereof. Naturally, it is also possible to mount the transfer device 4 on a robot arm or other movement mechanism, by which it is largely borne, while the guiding means are substantially used for guiding, for obtaining a particularly accurate positioning of the transfer device. It is then advantageous however, when at least a part of the weight and the occurring forces be borne by the mold 2. As the transfer device is included in the guides 22, it can be of relatively light design, while yet a great stability and rigidity can be obtained. This means that operating means, bearings and the like can be of relatively light design.

Figure 6:
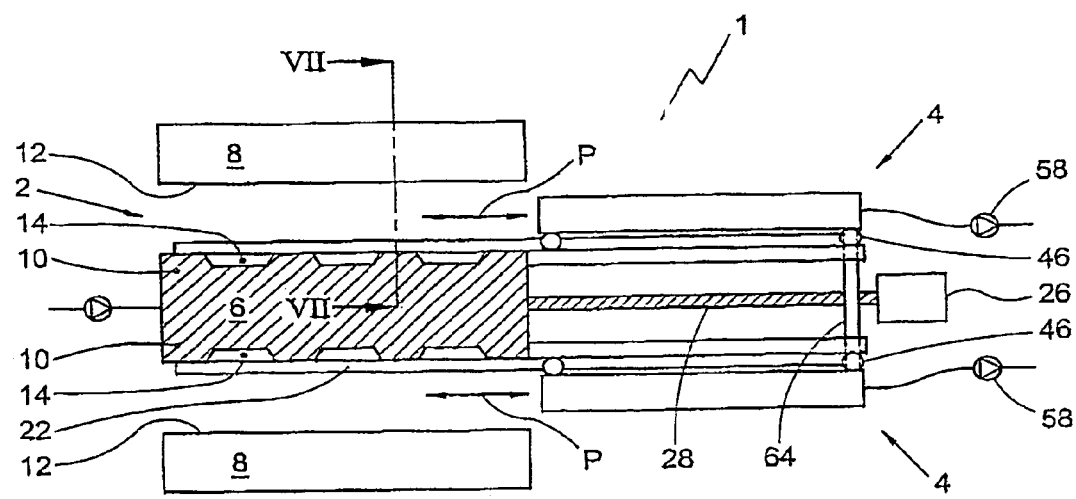
FIG. 6 shows, in partly cross-sectional top plan view, a first alternative embodiment of an apparatus according to the invention.
Figure 7:
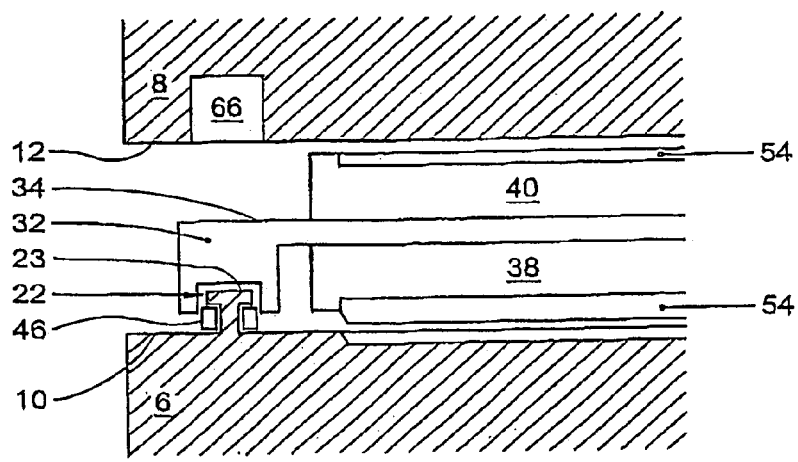
FIG. 7 shows, in cross sectional view along the line VII-VII in FIG. 6, a part of an apparatus according to the invention with opened mold.

FIGS. 6 and 7 schematically show in top and front view, respectively, an alternative embodiment of an apparatus 1 according to the invention, in which a double-acting mold 2 is used. This mold 2 comprises a fixed part 6, designed as a middle part having mold cavities 14 on opposite sides, and two moving parts 8. On both sides of the fixed mold part 6, a pair of guiding rails 22 are provided, such that the mold cavities 14 are included therebetween. Again, the guiding rails 22 reach beyond the contour of the mold part 6, such that the transfer devices 4 can be borne and guided thereon outside the mold 2 when the mold is closed, while the transfer devices 4 can be rolled between the middle part 6 and the two moving mold parts 8 when the mold 2 is opened as shown in FIG. 6. The transfer devices 4 are substantially designed as represented in FIG. 2 and are mutually coupled by a transverse rod 64 engaged by the spindle 28 of the motor 26. Therefore, the transfer devices 4 are moved synchronously.

As shown in FIG. 7, the guiding rail 22 has a substantially T-shape cross section, such that on both sides a wheel 46 of the transfer device 4 can be guided between the horizontal flange 23 and the closing face 10. The wheels are connected to the leg 32. Again, on the middle part 34, transfer parts 38 and 40 are borne, in a manner described earlier, while, schematically, vacuum means 54 are represented. In the closing face 12 of the moving mold part 8, opposite the guiding rail 22, a slotted recess 66 is provided in which, with the mold 2 closed, the guiding rail 22 can be received. In this embodiment, the mold 2 is provided with, for instance, six or twelve mold cavities 14. Naturally, also different numbers of mold cavities can be provided.

Figure 8:
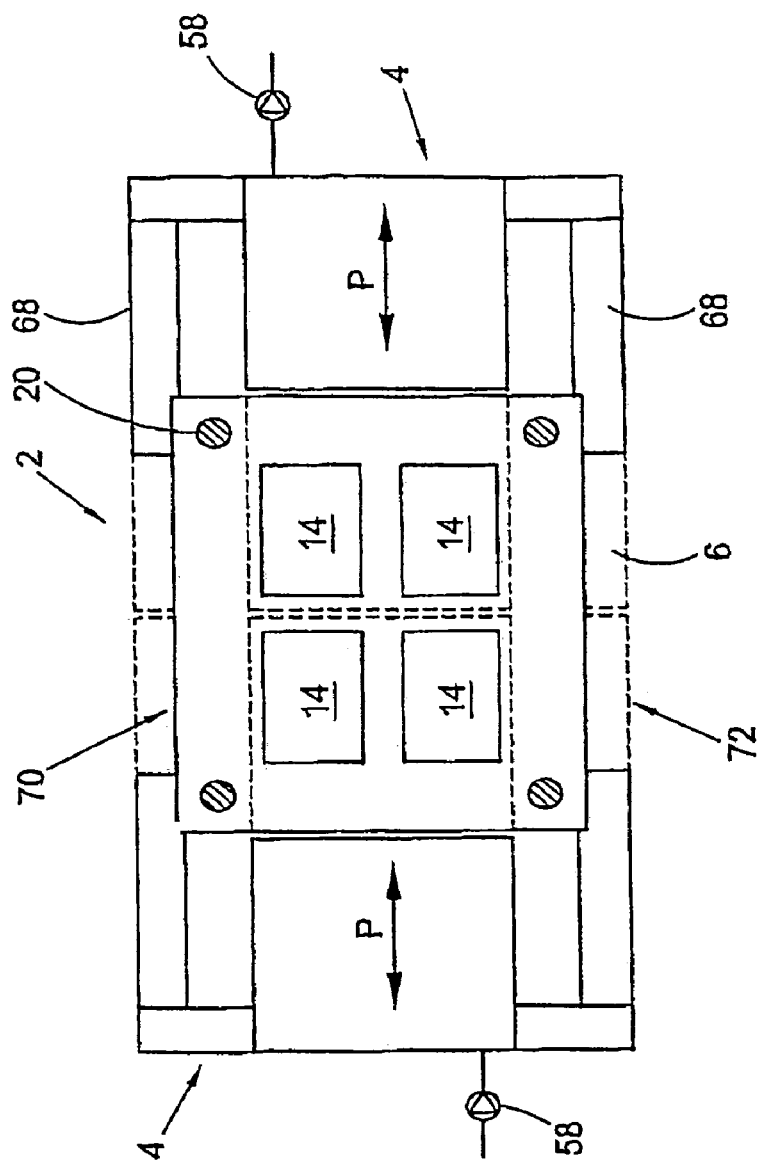
FIG. 8 schematically shows, in side view, with taken away movable part of the mold, a mold with transfer device in a second alternative embodiment.
Figure 9:
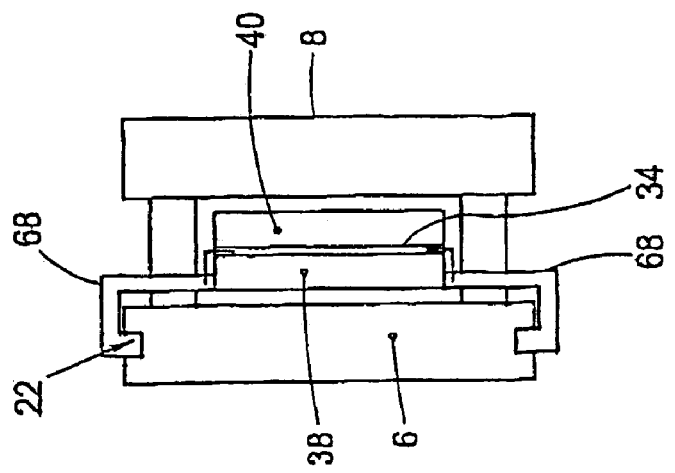
FIG. 9 shows, in font view, an apparatus according to FIG. 8.

In FIG. 8, in side view with taken-away movable mold part 8, a mold 2 with two transfer devices 4 is shown, while the driving means, in particular the motor and screw spindle, are omitted. In this embodiment, in the fixed mold part 6, four mold cavities 14 are included, between the guide rods 20. Each transfer device 4 is designed with a middle part 34 and, borne thereon, first and second transfer parts 38, 40 as described with reference to, for instance, FIGS. 2 and 5. In this embodiment, the middle part 34 is borne by two arms 68 extending on both sides thereof, which arms are substantially L-shaped in side view (FIG. 8) and slightly U-shaped in front view (FIG. 9). In the upper side 70 and underside 72 of the fixed mold part 6, slotted guiding rails 22 are provided in which the horizontally extending parts of the arms 68 are slideably received, such that the transfer devices 4 can be slid in the direction P between the position drawn in FIG. 8 in continuous lines wherein the mold 2 can be closed, and a position represented in FIG. 8 in broken lines wherein the transfer devices 4, at least the transfer part 38, 40 extend between the mold parts 6, 8, above the mold cavities 14, for caring out operations therein, for instance placing labels or taking out products as described hereinabove. As a result of the selected shape of the arms 68, the transfer device 4 can be moved between the guide rods 20, while simultaneously a good positioning is obtained. The fact is that, as a consequence of the selected guides, the transfer device 4 cannot but move in the direction P, i.e. in the longitudinal direction of the arms 68. As a result of the choice of two transfer devices 4 which extend from two opposite sides of the mold and are movable between the mold parts 6, 8, each of the trader devices 4 only needs to make a smaller stroke, so that the cycle times can be even more limited, or the occurring accelerations and decelerations can be kept smaller. Moreover, such a transfer device can thus be of a less rigid design. Such an embodiment is particularly suitable with, for instance, relatively large or long products or, conversely, with products which can be injection-molded with a relatively short cycle time.

Figure 10:
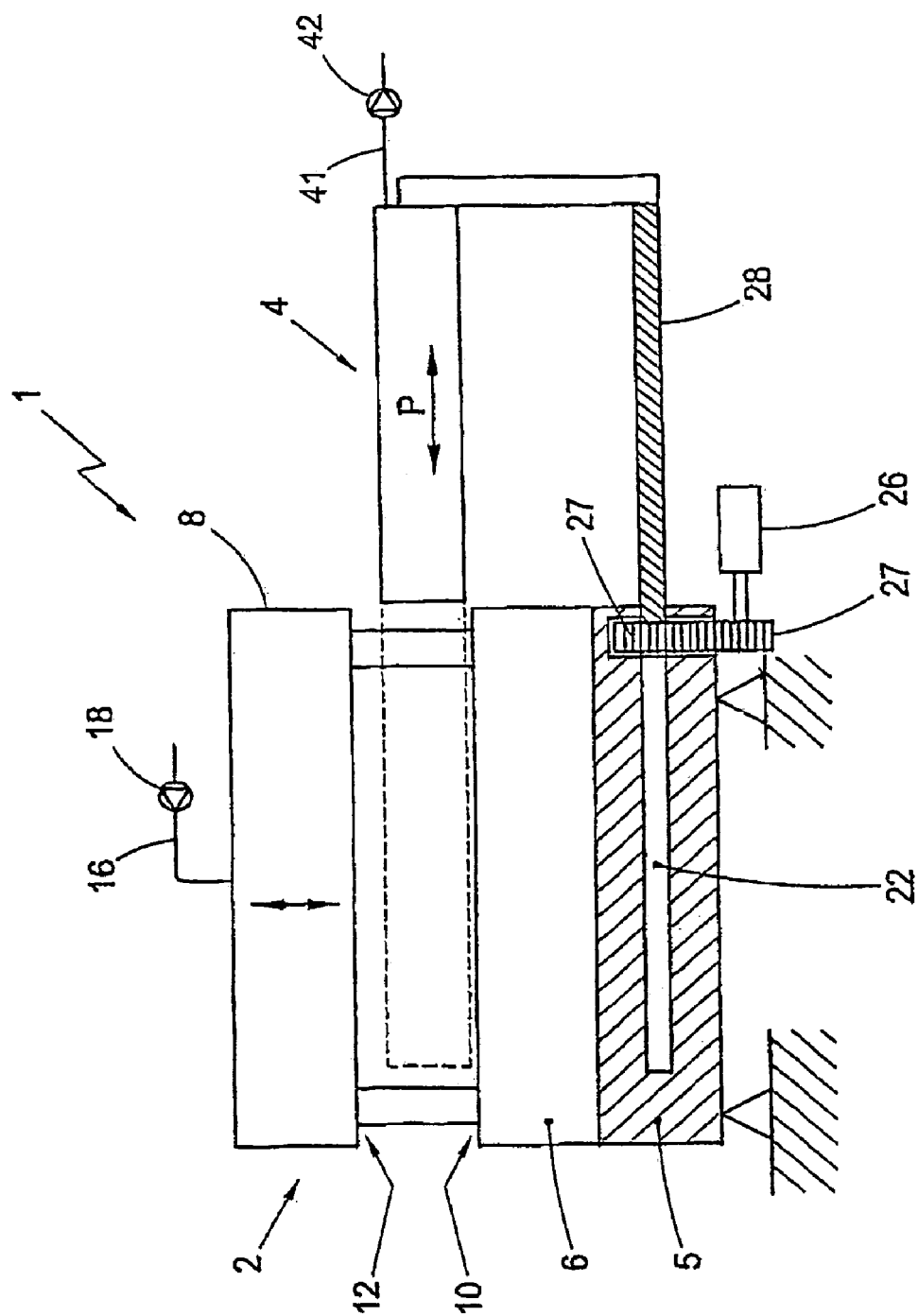
FIG. 10 shows a further alternative embodiment, while guiding means are included in a base plate.

FIG. 10 shows a further alternative embodiment of an apparatus 1 according to the invention, in which the stationary part 6 of the mold 2 comprises a base plate 5 with which the mold is included. In this base plate 5, which can for instance be a shim, parallel sides are formed for forming guiding rails 22, at least guiding means in which screw spindles 28 of the transfer device 4 can slide, in axial direction. Sliding is obtained with the aid of gear wheels 27 driven by the motor 26. Naturally, also other driving means can be used. As described hereinabove, the further transfer device 4 is borne by the screw spindles 28, so that it can be moved between the mold parts 6, 8. When exchanging the product forming mold parts, the transfer device 4 can remain behind with the base plate 5 in the press, which facilitates exchange. Naturally, in the same or a comparable manner, the guiding means can be provided at other positions in detachable parts of the mold and/or the injection molding machine.

In FIGS. 8 and 4, a supply device 74 for labels 60 and a discharge device 76 for products 48 are schematically shown. These can be designed in any suitable manner. For instance, a supply device 74 can be designed as described in NL 1012869, incorporated herein by reference, or as a conventional device for supplying precut labels. For instance, a discharge device 76 can be designed as a stacker, a discharge belt or such devices known per se.

The invention is not limited in any manner to the exemplary embodiments represented in the description and the drawings. As already indicated, any conceivable combination of parts as shown and described are understood to fall within the framework of the invention as described in the associated claims. Further, many different variations thereon are possible.

For instance, a transfer device 4 according to the invention can be driven in a different manner, for instance by direct-drive of one or more of the wheels 46, by using belt drive, pneumatic or hydraulic drive, gear drive and any other suitable form of drive. Further, molds 2 can consist of more than two parts and can be positioned in any possible orientation. Different guiding means can be provided for guiding the transfer device, for instance pivoting arms, magnetic guides, guides in the form of sleeves sliding along rods and the like. As shown, the transfer device can comprise some driving means, such as an electric, hydraulic or pneumatic motor, but can also be force-controlled in a manner known per se, so that the opening and closing movement of the mold causes movement of the transfer device. As a result, in a simple manner, an accurate movement of the transfer, device can be obtained and protection is possible in a simple manner. Such variants will be directly clear to the skilled person. Further, a transfer device 4 can be designed in a different manner, for instance arranged for placing inserts such as screw means, electronic means, holograms and the like in the mold cavity 4, or for carrying out other operations, such as cleaning, application of a demolding layer or the like. A mold 2 according to the invention can be designed with any desired number of mold cavities. In the exemplary embodiments shown, the guiding means are at least substantially provided in the stationary part of the mold. However, it will be clear that they can also be included in the movable part. Naturally, the mold can also be provided with injection points at different positions and different ejection means can be provided for removing products from the mold cavities 14, for instance conventional ejection pins, the product then falling from the mold 2 under the influence of gravity. A transfer device to be used therewith can then, for instance, be designed without first transfer part 38.

These and many comparable variations are deemed to fall within the framework of the invention as outlined by the claims.

The invention claimed is:

1. An apparatus for injection-molding products comprising;
   an injection mold divisible into at least two parts, such that, as a result, at least one mold cavity provided in said injection mold is cleared;
   a guiding rail provided on at least one part of the injection mold;
   a transfer device movably supported in or on said guiding rail for placing an insert into a mold cavity and/or taking a product from a mold cavity; and
   a motor connected to said transfer device for driving said transfer device along said guiding rail into and out of said injection mold,
   wherein said injection mold comprises a fixed part having a joint face and a movable part having a joint face, said joining faces of said fixed part and said movable part meeting upon closure of said injection mold, and wherein said transfer device comprises a base, a first transfer part supported on said base and a first piston/cylinder assembly acting between said base and said first transfer part for moving said first transfer part toward or away from said base to respectively remove an item from or place an item into said cavity.

2. An apparatus according to claim 1, wherein guiding rails are provided on opposite sides of the at least one mold cavity.

3. An apparatus according to claim 1, wherein the injection mold comprises a joining face in which parts of the mold cavities terminate, wherein said guiding rail extends beyond the contour of said joining face, such that the transfer device can be moved at least largely beyond said contour before the injection mold is closed.

4. An apparatus according to claim 1, wherein the transfer device comprises sleeve bearings or roller bearings with which said transfer device is borne by said guiding rail.

5. An apparatus according to claim 1, wherein said guide rail is provided at least partly in or on a joining face of the injection mold.

6. An apparatus according to claim 1, wherein the transfer device is provided on at least one side with first engaging means for engaging a film-shaped label and placing this in a mold cavity.

7. An apparatus according to claim 6, wherein the transfer device is provided on at least one side with second engaging means for engaging a product in a mold cavity.

8. An apparatus according to claim 7, wherein the first and/or second engaging means are vacuum means.

9. An apparatus according to claim 1, wherein the guiding rail is provided on a part of the injection mold which, during use, is substantially stationary.

10. An apparatus according to claim 1, wherein the guiding rail is provided at least partly on at least one side of the at least one part of the injection mold.

11. An apparatus according to claim 1, wherein the guiding rail is substantially provided on the side of the injection mold connected to a supply duct of the injection molding apparatus.

12. An apparatus according to claim 1, wherein guiding rails are provided on at least two sides of frame parts in which the injection mold is fixed.

13. An apparatus according to claim 1, wherein the injection mold comprises a middle part and two closing parts arranged on either side thereof, while on both sides of the middle part at least one mold cavity is provided, wherein guiding rails are provided on both sides of the middle part.

14. An apparatus according to claim 1, wherein the transfer device has a slightly U-shaped cross section defining a middle part and two legs, the legs of which bear counter means for the guiding rail.

15. An apparatus as defined in claim 1, wherein said guiding rail comprises a rail member extending outward from said joining face of said fixed part, and wherein said joining face of said moving part includes a recess formed therein for receiving said rail member upon closure of said mold.

16. An apparatus as defined in claim 1, wherein said guiding rail comprises a groove formed in said joining face of said fixed part, and wherein said transfer device includes a foot slidably received in said groove.

17. An apparatus as defined in claim 1, wherein said transfer device further comprises a second transfer part supported on said base opposite said first transfer part and a second piston/cylinder assembly acting between said base and said second transfer part for moving said second transfer part toward or away from said first transfer part to respectively remove an item from or place an item into said mold.

* * * * *

UNITED STATES PATENT AND TRADEMARK OFFICE
CERTIFICATE OF CORRECTION

PATENT NO. : 7,302,995 B2  Page 1 of 1
APPLICATION NO. : 10/486935
DATED : December 4, 2007
INVENTOR(S) : Alberts It is certified that error appears in the above-identified patent and that said Letters Patent is hereby corrected as shown below:

Column 4, line 17,      now reads "next to the trader device"

should read --next to the transfer device--

Column 4, line 44      now reads "to the dosing faces"

should read --to the closing faces--

Column 5, line 15      now reads "cylinder assembly 86"

should read --cylinder assembly 36--

Column 6, line 50      now reads "caring out operations"

should read --carrying out operations--

Column 6, line 60      now reads "of the trader devices"

should read --of the transfer devices--

Signed and Sealed this

Thirteenth Day of May, 2008

JON W. DUDAS
*Director of the United States Patent and Trademark Office*